United States Patent
Kruglick (10) Patent No.: US 8,404,199 B2
(45) Date of Patent: Mar. 26, 2013

(54) FLUORINE BASED VANADIUM BORIDE NANOPARTICLE SYNTHESIS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 76 days.

(21) Appl. No.: 12/999,963

(22) PCT Filed: Aug. 6, 2010

(86) PCT No.: PCT/US2010/044705
§ 371 (c)(1),
(2), (4) Date: Dec. 17, 2010

(87) PCT Pub. No.: WO2012/018346
PCT Pub. Date: Feb. 9, 2012

(65) Prior Publication Data
US 2012/0034141 A1   Feb. 9, 2012

(51) Int. Cl.
*B01D 11/00* (2006.01)
*C01G 33/00* (2006.01)
*B01J 19/00* (2006.01)

(52) U.S. Cl. ............. 423/62; 423/68; 422/198; 977/896

(58) Field of Classification Search .................. None
See application file for complete search history.

(56) References Cited

U.S. PATENT DOCUMENTS

| | | | |
|---|---|---|---|
| 3,032,399 A | 5/1962 | Hoke et al. | |
| 3,306,942 A | 2/1967 | Lee | |
| 3,440,153 A | 4/1969 | Arnoldi et al. | |
| 5,015,799 A | 5/1991 | Walker et al. | |
| 5,081,077 A | 1/1992 | Tani et al. | |
| 5,622,639 A | 4/1997 | Kitayama et al. | |
| 5,989,514 A | 11/1999 | Bi et al. | |
| 7,541,013 B2 * | 6/2009 | Shim et al. ............. | 423/297 |
| 2004/0048157 A1 * | 3/2004 | Neudecker et al. ........ | 429/231.2 |
| 2004/0054016 A1 | 3/2004 | Lu et al. | |
| 2004/0178530 A1 | 9/2004 | Yadav | |
| 2006/0281880 A1 | 12/2006 | Apecetche et al. | |
| 2008/0233032 A1 | 9/2008 | Shim et al. | |
| 2008/0267834 A1 | 10/2008 | Kim et al. | |

OTHER PUBLICATIONS

Gupta; Chemical Metallurgy: Principles and Practice; 2006.*
Shi, L. et al., "Low-temperature synthesis of nanocrystalline vanadium diboride", Materials Letters (2004) vol. 58, Issue 22-23, pp. 2890-2892.
International Search Report dated Sep. 27, 2010 for Application No. PCT/US2010/044705.
Cai, P. et al., "Low temperature synthesis of NbB2 nanorods by a solid-state reaction route", *Materials Letters 59*, No. 28 Dec. 2005, pp. 3550-3552.

(Continued)

*Primary Examiner* — Melvin C Mayes
*Assistant Examiner* — Guinever Gregorio
(74) *Attorney, Agent, or Firm* — Dorsey & Whitney LLP (57) ABSTRACT

The present disclosure generally relates to Vanadium Boride nanoparticle synthesis. In some examples, a method is described that includes fluorine based Vanadium Boride nanoparticle synthesis. In some examples, the method includes providing Vanadium Boride battery waste products, treating the battery waste products to treat precursors for fluorination, heating the precursors for fluorination to form $VF_3$ and $BH_3$ and heating the $VF_3$ and $BH_3$ to form $VB_2$ nanorods in a liquid mixture, wherein the method is performed at less than approximately 700° C.

17 Claims, 5 Drawing Sheets

OTHER PUBLICATIONS

Goncharov, A. et al., "Nanostructured Films of Vanadium Borides", *Inorganic Materials 41*, No. 7 2005, pp. 696-699.

Joerissen, L. et al., "Possible use of vanadium redox-flow batteries for energy storage in small grids and stand-alone photovoltaic systems", *Journal of Power Sources 127*, No. 1-2 Mar. 10, 2004, pp. 98-104.

Licht, S. et al., "A novel alkaline redox couple: Chemistray of the Fe 6+/B 2− super-iron boride battery", *Chemical Communications 2007*, No. 26 2007, pp. 2753-2755.

Licht, S. et al., "Renewable highest capacity VB 2/air energy storage", *Chemical Communications 2008*, No. 28 2008, pp. 3257-3259.

Makarenko, G. et al., "Interaction of boron carbide with vanadium oxide", *Powder Metallurgy and Metal Ceramics 37*, No. 3 1998, pp. 229-231.

Rudneva, V. et al., "Investigation of thermal oxidation resistance of nanopowders of refractory carbides and borides", *Russian Journal of Non-Ferrous Metals 48*, No. 2 2007, pp. 143-147.

\* cited by examiner

501 a computer program product.

503 a signal bearing medium.

505 computer executable instructions relating to:

- treating Vanadium Boride battery waste products to form precursors for fluoridation;

- heating the precursors for fluoridation to form $VF_3$ and $BH_3$; and

- heating the $VF_3$ and $BH_3$ to form $VB_2$ nanorods.

| 506 a computer-readable medium | 508 a recordable medium | 506 a communication medium |

Fig. 5

FLUORINE BASED VANADIUM BORIDE NANOPARTICLE SYNTHESIS

BACKGROUND

Metal-air batteries are electro-chemical batteries powered by oxidizing the metal ion with oxygen from the air. These batteries have high energy densities and are relatively inexpensive to produce. Vanadium Boride ($VB_2$) has a high melting point, high hardness, and high electric conductivity and thus may be useful as the metal in metal-air batteries. The high specific energy of Vanadium Boride oxidation makes it competitive with hydrocarbons for use as a fuel.

Fabrication of Vanadium Boride is typically done using temperatures over 1000° C. to ultimately create solid chunks of Vanadium Boride that are subsequently milled into suitable size and configuration.

SUMMARY

This disclosure is drawn, inter alia, to methods, apparatus, computer programs and systems related to synthesizing Vanadium Boride nanoparticles. More specifically, various methods and systems for synthesizing Vanadium Boride nanoparticles using fluorine are described. Generally, in some examples, intermediate vanadium fluoride and sodium borohydride are formed and these are reacted to form, among other things, Vanadium Boride.

In one example, a method for Vanadium Boride synthesis is provided. The method includes providing Vanadium Boride battery waste products, treating the battery waste products to form precursors for fluorination, heating the precursors for fluorination to form $VF_3$ and $BH_3$, heating the $VF_3$ and $BH_3$ to form $VB_2$ nanorods in a liquid mixture wherein the method is performed at a temperature that is less than approximately 700° C.

In another example, another method for Vanadium Boride synthesis is provided. The method includes providing $V_2O_x$ and $B_2O_x$, adding $(NH_4)HF_2$ to the $V_2O_x$, acid dissolving the $B_2O_x$ to form $(NH_4)_3VF_6$ and $H_2O$ and washing the $B_2O_x$ with NaOH to form $NaBH_4$, adding to the $(NH_4)_3VF_6$ and heating the $(NH_4)_3VF_6$, $H_2O$, and $NaBH_4$ to above approximately 300° C. to form $3 NH_3$, $3 HF$, $VF_3$, NaH, and $BH_3$, and heating the $3 NH_3$, $3 HF$, $VF_3$, NaH, and $BH_3$ to above 500° C. to form $VB_2$ nanorods, HF, NaF, and $H_2$.

In yet another example, a computer accessible medium having stored thereon computer executable instructions, which, when executed by a computing device, operably enable the computing device to perform a procedure for Vanadium Boride synthesis is provided. The procedure may include treating Vanadium Boride battery waste products to form precursors for fluorination, heating the precursors for fluorination to form $VF_3$ and $BH_3$, and heating the $VF_3$ and $BH_3$ to form $VB_2$ nanorods.

In a further example, a system for Vanadium Boride synthesis is provided. The system may include a chamber, a shell, a heating element, a pump, and a controller. The chamber may be configured for receiving $V_2O_x$ and $B_2O_x$. The shell may be configured for receiving the container. The heating element may be operably associated with the chamber and configured for heating the chamber. The pump may be operably associated with the chamber and configured for adjusting pressure in the chamber. The controller may be coupled to the heating element and the pump and configured for operating the heating element to heat the chamber and operating the pump to adjust pressure in the chamber.

While multiple examples are disclosed, still other examples will become apparent to those skilled in the art from the following detailed description. As will be apparent, the systems, apparatuses, and methods described herein may be capable of modifications in various obvious aspects, all without departing from the spirit and scope of the teachings herein. Accordingly, the detailed description is to be regarded as illustrative in nature and not restrictive.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

In the drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly and implicitly contemplated herein.

This disclosure is drawn, inter alia, to methods, apparatus, computer programs and systems related to synthesizing Vanadium Boride nanoparticles. More specifically, various methods and systems for synthesizing Vanadium Boride nanoparticles using fluorine are described. Generally, in some examples, intermediate vanadium fluoride and sodium borohydride are formed and these are reacted to form, among other things, Vanadium Boride.

Vanadium boride can be configured for use as a metal-air battery. Metal-air batteries are electro-chemical batteries powered by oxidizing the metal ion with oxygen from the air. These batteries have high energy densities and are relatively inexpensive to produce. A common metal oxide used in metal-air batteries is zinc. Zinc has a $3e^-$ per molecule oxidation. In contrast to zinc, Vanadium Boride has an 11e$^-$ per molecule oxidation. This means that the relative energy density of Vanadium Boride to zinc is much higher. Electrochemical batteries have not typically been considered useful for powering vehicles because of the lower volumetric capacity of electrochemical energy compared to gasoline energy. Vanadium Boride has a volumetric capacity of electrochemical energy more comparable to that of a fossil fuel and thus may be comparable to a fossil fuel in energy capacity.

Metal-air battery usage involves oxidation of the metal ion to convert chemical energy in the battery to electrical energy. During such oxidation, waste products may be formed. The relative size of the waste products and permeability of the waste products may impact continued oxidation of the metal. In Vanadium Boride battery oxidation, fuel wastes may include $V_2O_5$ and $B_2O_3$ as well as various hydrides of the same. The waste molecules can be relatively large and effectively form a shell over the battery that can block further entry of oxygen into the battery. In a configuration where the Vanadium Boride is formed as a block, the result is that the interior metal is not exposed to oxygen after the exterior metal is oxidized and the resultant waste products formed. Thus, for effective use of Vanadium Boride in a battery or fuel cell, the geometric configuration of the Vanadium Boride may be selected to permit oxygen and electrons to flow in a controlled manner such that substantially all of the Vanadium Boride material may be exposed to oxygen.

Nanoparticles or nanorods may be suitable for use as biological tags, absorbers, pigments, or electronic element. Nanorods are one morphology of nanoscale objects having dimensions ranging from about 1 nm to about 100 nm. Example nanorod aspect ratios (length divided by width) are approximately in a range from about 3 to about 5. Because of the geometric configuration of nanoparticles, and more specifically in some examples, nanorods, substantially all of the available Vanadium Boride may be oxidized.

Some processes for synthesizing Vanadium Boride involve very high temperatures (commonly above 1000° C.). At these high temperatures, individual molecules tend to coalesce to form a relatively large block. Thus, conventional synthesis of Vanadium Boride may create a microporous block of Vanadium Boride. The geometry of such block is not suitable for use as a battery or fuel cell because the interior Vanadium Boride becomes effectively blocked by oxidation waste products. Thus, a block of Vanadium Boride can be further machined, such as by milling, to form smaller particles that then may be used in a battery device.

In various examples discussed herein, processes may performed at low temperatures (occurring at less than approximately 600° C. to approximately 750° C.) and do not generally use milling or other further particulation. At lower temperatures, for example between about 200° C. and about 600° C. a boron based molecule, such as borohydride (BHx), forms as a precursor. The boron molecules nucleate on existing Vanadium Boride molecules. More specifically, the hydrogens of the BHx molecule are displaced by vanadium, thus forming Vanadium Boride. The molecules nucleate on existing $VB_2$ or can spontaneously form new $VB_2$. This nucleation can be utilized to form a nanoparticle or a nanorod.

Figure 1:
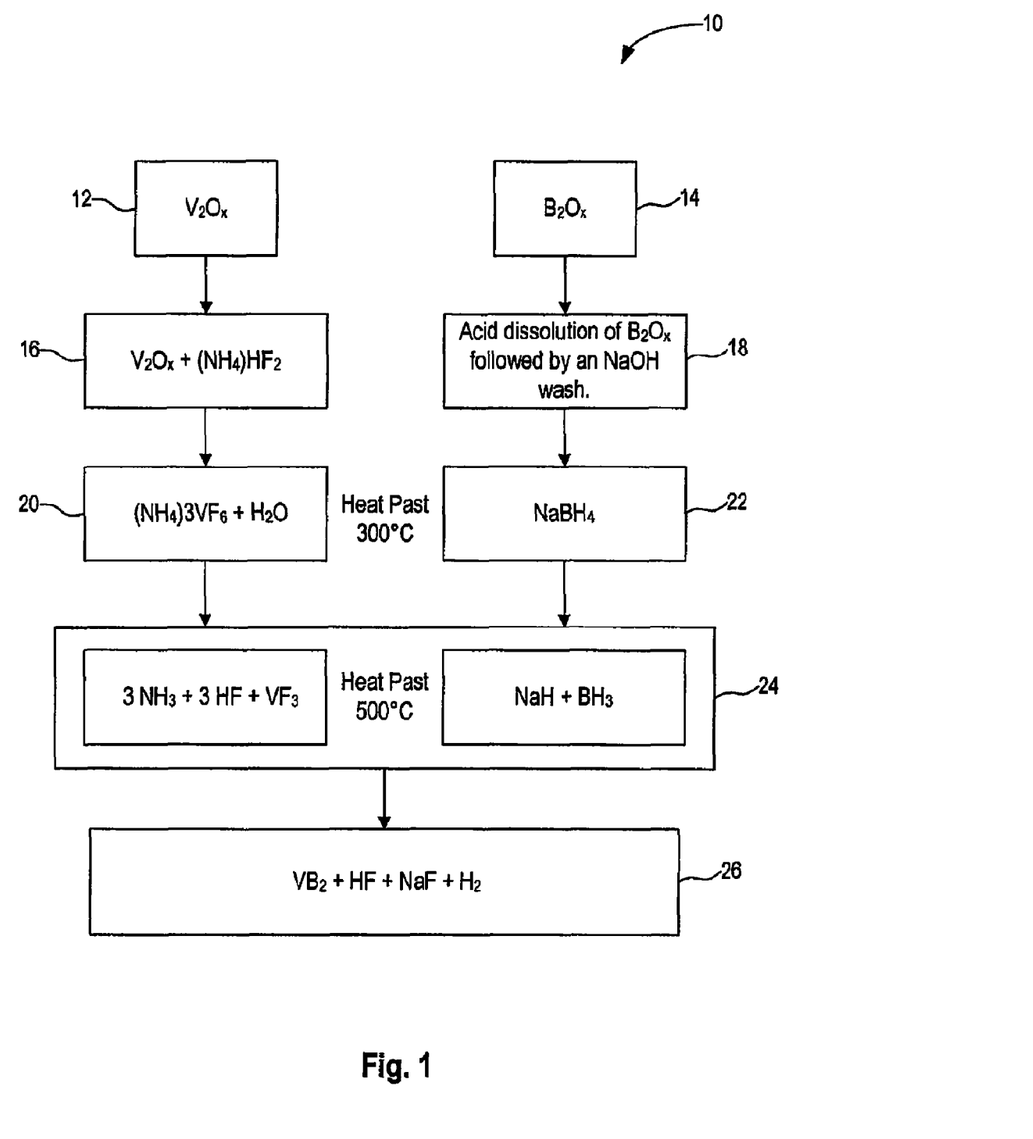
FIG. 1 illustrates an example of a general method for Vanadium Boride nanoparticle synthesis, in accordance with some examples of the present disclosure.

FIG. 1 illustrates an example of a general method 10 for Vanadium Boride nanoparticle synthesis, arranged in accordance with at least some examples of the present disclosure. In the example shown, $V_2O_x$ and $B_2O_x$ are the starting materials for the process [blocks 12 and 14]. In some examples, these materials may be provided as battery waste from a spent Vanadium Boride battery. In some alternative example, one or both of these materials may be provided from a different source. It is to be appreciated that these products may be generalized as $B_2O_3$ and $V_2O_5$, which are the respective anhydride salts of boric acid and vanadaic acid. In solution, the products may vary with the hydroxide concentration and depth of discharge, including hydrogen and metal cation containing species.

Group 7 elements, such as Vanadium, can be utilized to form crystalline structures with boron. While chlorine may be used as a mediator for some Group 7 elements (e.g., niobium), chlorine lacks the oxidizing power to induce the 5$^{th}$ valence state of Vanadium, so $VCl_5$ does not exist in any reasonable industrial environment. Further $VCl_4$ is unstable and begins to decompose before $NaBH_4$ begins to decompose. Fluorine is a strong oxidizer and thus may be used as an intermediary in forming Vanadium Boride. In various examples described herein, formation of Vanadium Boride thus may include vanadium fluoride as an intermediate state.

Returning to FIG. 1, $V_2O_x$ and $B_2O_x$ may be treated at blocks 12 and 14 to form the precursors for fluorination. Thus, block 16 illustrates $V_2O_x + (NH_4)HF_2$ and block 18 illustrates acid dissolution of $B_2O_x$ followed by an NaOH wash. These processes may be done separately –for example, $V_2O_x$ and $(NH_4)HF_2$ combined in one container and treatment of $B_2O_x$ in another container, or may be done together.

As shown at blocks 20 and 22, hexafluorovanadate ($(NH_4)_3VF_6$) and sodium borohydride ($NaBH_4$) are formed. While other vanadium fluorides contribute to the reaction, hexafluorovanadate may be maximized to facilitate the reaction. Lower energy vanadium fluorides ($VF_5$ and below) generally will scavenge other vanadiums, thus freeing up fluorine and HF, and assisting in forming more $VF_6$.

Water ($H_2O$) is added at least to the hexafluorovanadate [block 20] (if processing separately). The hexafluorovanadate and sodium borohydride can be heated, generally to a temperature above 300° C. Heating causes thermal decomposition of the hexafluorovanadate to ammonia, HF, and $VF_3$. Generally, once the temperature exceeds about 300° C., $VF_3$ is preferentially formed. Thermal decomposition may evolve considerable gas, which may lead to increased pressure. Increased pressure may be utilized to accelerate the process.

The resultant chemistry from the thermal decomposition of blocks 20 and 22 is shown at block 24: $3 NH_3 + 3 HF + VF_3$ and $NaH + BH_3$. Continued heating is performed to a temperature above approximately 500° C. More generally, temperature at this step may be between approximately 400° C. and approximately 650° C. As the temperature increases, the $BH_3$ further combines with the Vanadium to release hydrofluoric acid. The hydrofluoric acid and hydrogen further accelerate the process. As the temperature approaches 500° C., the $VF_3$ breaks up and forms Vanadium Boride. It is to be noted that the processing of $V_2O_x$ to $3NH_3$, 3HF, and $VF_3$ (blocks 12, 16, and 20) may be done separately from the processing of $B_2O_x$ to NaH and $BH_3$ (blocks 14, 18, 22). If processed separately, the resultant compounds are combined at block 24 to form Vanadium Boride.

By approximately 500° C., nanocrystallilzaton of Vanadium Boride ($VB_2$) is substantially complete, shown at block 26. In addition to $VB_2$, HF, NaF, and hydrogen (HO are created.

It is to be appreciated that the equations of FIG. 1 are not balanced and that the amount of HCl, NaCl, and $H_2$, for example, will exist in varying ratios depending on pH, temperature, and impurities.

Figure 2:
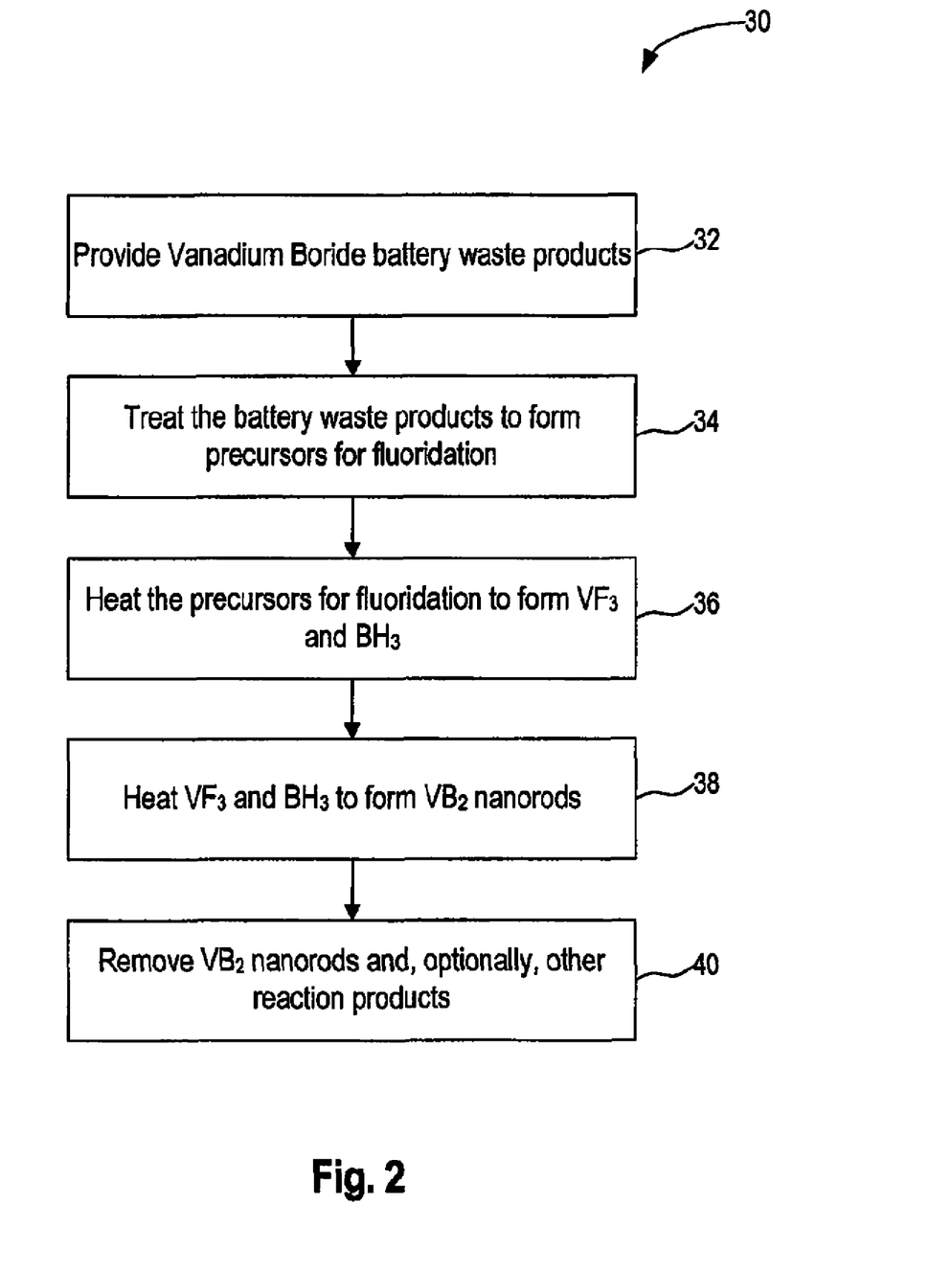
FIG. 2 illustrates a simplification of the general method for Vanadium Boride nanoparticle synthesis shown in FIG. 1, in accordance with some examples of the present disclosure.

FIG. 2 illustrates a simplification 30 of the general method for Vanadium Boride nanoparticle synthesis shown in FIG. 1, in accordance with at least some examples of the present disclosure. As shown, Vanadium Boride battery waste products are provided [block 32]. The battery waste products may be salvaged from any used Vanadium Boride battery using any suitable system. Alternatively, the battery waste products may be salvaged from other industrial sources. In mass production, belt feeds may be provided leading to a chamber used for synthesis of the materials (referred to as "the synthesis chamber").

The waste products are treated to form precursors for fluorination [block 34]. In some examples, sodium borohydride ($NaBH_4$) is recovered from a $B_2O_3$ by acid wash and sodium hydroxide quench. Such recovery may be done at a recycling center or prior to mixing in the synthesis chamber. The $V_2O_x$ is exposed to ammonium bifluoride [$(NH_4)HF_2$ -] to make hexafluorovanadate [$(NH_4)_3VF_6$] and water. This may be done at a recycling center, otherwise separate from synthesis of the materials, or in the synthesis chamber. It is to be appreciated that neither the recovery nor the exposure to ammonium bifluoride is typically done in a pressure vessel at pressure. Further, neither the recovery nor the exposure to ammonium bifluoride is typically done at high temperature. Accordingly, in some examples each of the recover and the exposure to ammonium bifluoride may be done in open vats. The precursors for fluorination are heated past approximately 300° C. to form $VF_3$ and $BH_3$ [block 36]. A hot plate or other heating element may be used to heat the precursors for fluorination. The heating element may be associated directly or indirectly with the synthesis chamber (e.g., the inert chamber 52 of FIG. 3). In a specific example, the steel shell 55 (see FIG. 3) may be heated using inductive heating. The $VF_3$ and $BH_3$ are heated past approximately 500° C. to form $VB_2$ nanorods [block 38]. In some examples, the pressure inside the steel shell 55 may be increased, for example, by pumping fluid (gas or liquid) into the steel shell 55 using a pump. The pump may be associated directly or indirectly with the synthesis chamber (e.g., the inert chamber 52). The $VB_2$ nanorods, and optionally other reaction products, may then be removed [block 40]. In some examples, HF and $H_2$ may be piped out of the synthesis chamber as gas. Water may then be piped in to dissolve the NaF and other impurities and create a resulting liquid. The resulting liquid may be sluiced across a filter to collect the nanorods. The nanorods may be vacuum dried to minimize sticking.

Figure 3:
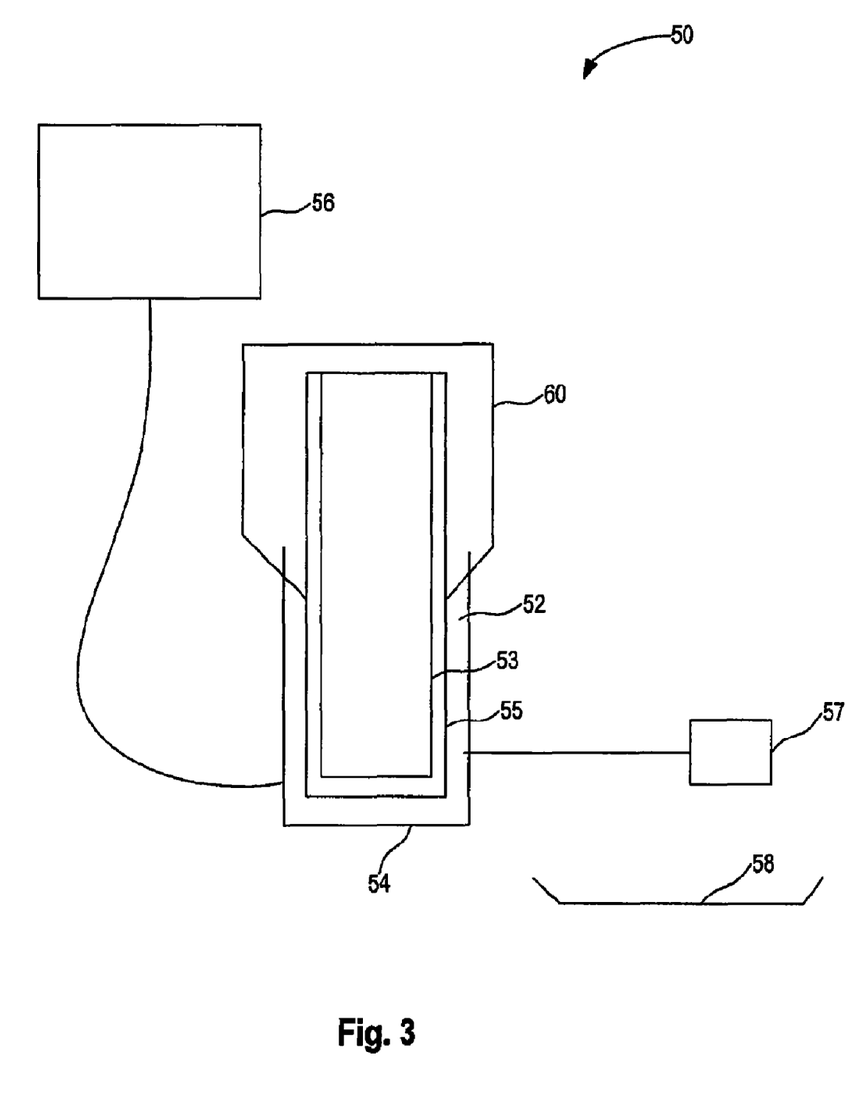
FIG. 3 illustrates a schematic view of a system for Vanadium Boride nanoparticle synthesis, in accordance with some examples of the present disclosure.

FIG. 3 illustrates a schematic view of a system 50 for Vanadium Boride nanoparticle synthesis, in accordance with some examples of the present disclosure. As shown, the example system 50 may include an inert chamber 52, a heating element 54, a pump 57, a computing device 56, a filter 58, and a capture element 60.

The inert chamber 52 may comprise a nonreactive material such as a quartz tube 53 and a stainless steel (or other material) shell 55 for receiving the quartz tube. Generally, the shell may be configured to prevent pressure within the quartz tube from rupturing the quartz tube. Thus, the shell may be formed such that it fits snugly around the quartz tube and has an appropriate coefficient of thermal expansion to support and move with the quartz tube. The described reactions can be carried out in the inert chamber 52. The chamber can be configured with an inert atmosphere that may be achieved with an inert gas such as argon or any other suitable inert gas such as xenon or nitrogen. The heating element 54 and the pump 57 may be directly or indirectly associated with the chamber 52. For example, the heating element 54 and/or the pump 55 may be directly coupled to the chamber 52. Alternatively, the heating element 54 and/or the pump 57 may be indirectly coupled to the chamber 52 via the shell 55.

In use, the Vanadium Boride battery waste products ($V_2O_x$ and $B_2O_x$) may be combined in the quartz tube 53. The quartz tube 53 then may be used as the container for all reactions described with respect to FIG. 1. The quartz tube 53 can be inserted in the shell 55, such as a stainless steel autoclave. The shell 55 may be heated using standard means, such as by association with a heating element 54. In some examples, the quartz tube 53 may alternatively have an associated steel jacket (not shown) into which it may be inserted.

After the reactions of FIG. 1, the resultant products include Vanadium Boride nanords and one or more of HF, NaF, and $H_2$. HF exists as a gas in the reaction but is more commonly thought of as hydrofluoric acid. HF present as an end product may etch the quartz tube 53 and thus it may be desirable to remove the HF in a timely manner. Other materials may be used for the tube 53 that are more resistant to HF but these materials generally are more expensive. If water remains in the process through the reactions of FIG. 1, hydrofluoric acid may be salvaged from the products and re-used. The HF and $H_2$ may be removed at a high temperature or low pressure, leaving the NaF and $VB_2$. An elevated temperature while recovering HF reduces the likelihood of HF bonding with water. Accordingly, any temperature and pressure combination where water is in a gaseous state (accordingly above 100° C. at room temperature) may be used. The NaF and $VB_2$ may be separated. In some examples, the gases may be captured using the capture element 60 and the liquid mixture (with solid $VB_2$) poured through the filter 58 to separate and capture the $VB_2$.

The computing device 56, or some other similarly adapted controller, may be coupled to one or more of the described devices in system 50. The computing device 56 can be configured to control heating temperatures (e.g., temperature set point, rate of temperature change, dwell time at a temperature, etc.), chamber pressure (including gas purge and backfill operations), or quantities and rate of adding materials to the reaction, as well as other process parameters of the Vanadium Boride synthesis.

The disclosed process involves a low input energy (only about 500° C. for processing) and eliminates milling. By keeping the input energy close to the formation energy of Vanadium Boride, the Vanadium Boride can grow in crystals rather than coalescing into solid chunks.

Figure 4:
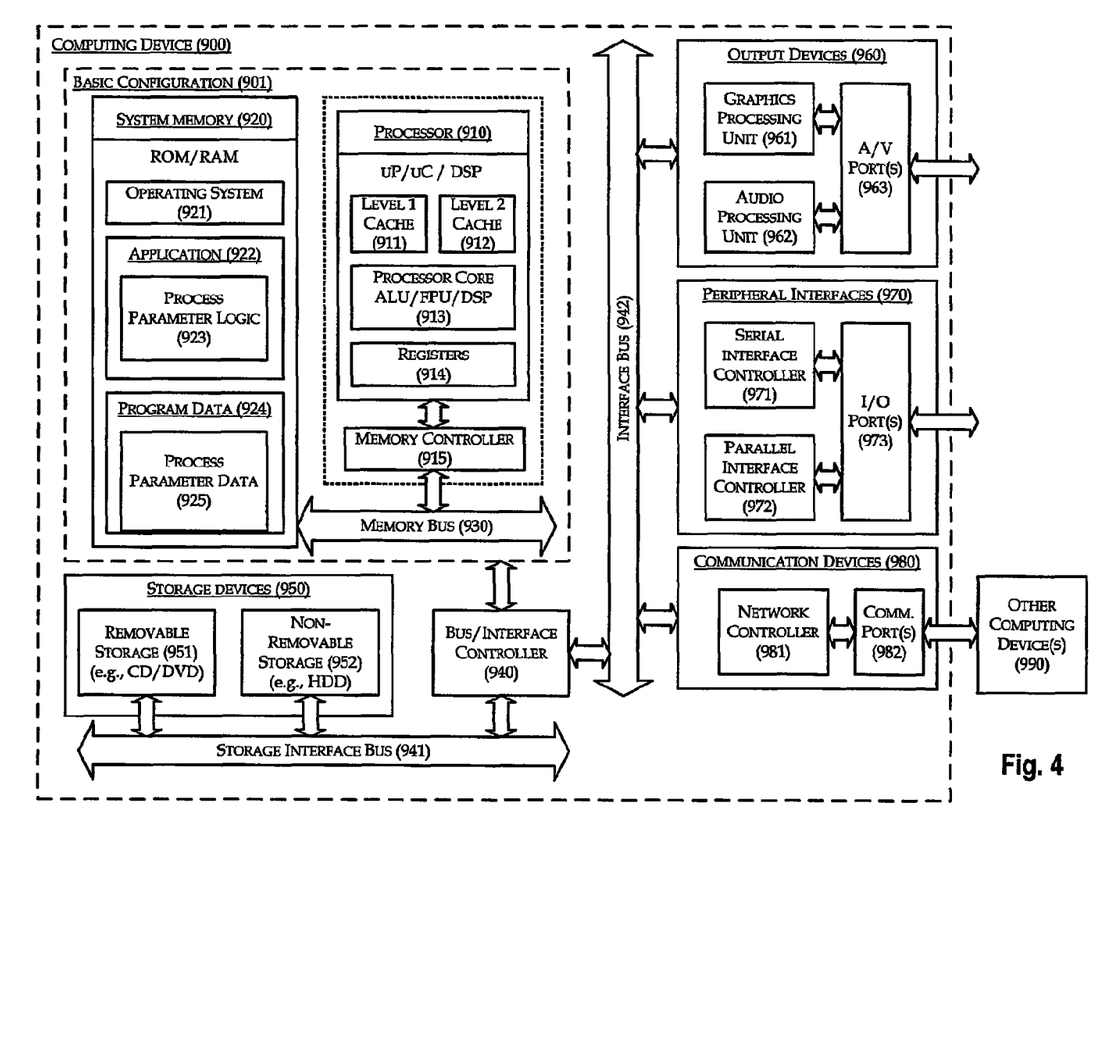
FIG. 4 is a block diagram illustrating an example computing device that is arranged for fluorine based Vanadium Boride nanoparticle synthesis, in accordance with some examples of the present disclosure.

FIG. 4 is a block diagram illustrating an example computing device 900 that is arranged for fluorine based Vanadium Boride nanoparticle synthesis in accordance with the present disclosure. Computing device 900 is one example device that may be utilized as a controller for one or more of the processes described herein. In a very basic configuration 901, computing device 900 typically includes one or more processors 910 and system memory 920. A memory bus 930 may be used for communicating between the processor 910 and the system memory 920.

Depending on the desired configuration, processor 910 may be of any type including but not limited to a microprocessor (µP), a microcontroller (µC), a digital signal processor (DSP), or any combination thereof. Processor 910 may include one more levels of caching, such as a level one cache 911 and a level two cache 912, a processor core 913, and registers 914. An example processor core 913 may include an arithmetic logic unit (ALU), a floating point unit (FPU), a digital signal processing core (DSP Core), or any combination thereof. An example memory controller 915 may also be used with the processor 910, or in some implementations the memory controller 915 may be an internal part of the processor 910.

Depending on the desired configuration, the system memory 920 may be of any type including but not limited to volatile memory (such as RAM), non-volatile memory (such as ROM, flash memory, etc.) or any combination thereof. System memory 920 may include an operating system 921, one or more applications 922, and program data 924. Application 922 may include a process parameter logic 923 for controlling process parameters for Vanadium Boride nanoparticle synthesis. Program Data 924 includes process parameter data 925 including, for example, temperature controls, pressure controls, or others. In some examples, temperature controls may control a temperature of a stainless steel autoclave. In some embodiments, application 922 may be arranged to operate with program data 924 on an operating system 921 such that the computer system may be operably associated with a system for Vanadium Boride nanoparticle synthesis and may control process parameters of the system for Vanadium Boride nanoparticle synthesis. Process parameters that may be controlled include temperature, pressure, timing of the addition of ingredients, dwell times, temperature set points, pH, detection of end-of-process, and evacuation and back fill of chambers. This described basic configuration is illustrated in FIG. 4 by those components within dashed line 901.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of device 900.

Computing device 900 may also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which may be configured to communicate to various external devices such as a display or speakers via one or more A/V ports 963. Example peripheral interfaces 970 include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which may be arranged to facilitate communications with one or more other computing devices 990 over a network communication link via one or more communication ports 982.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

Figure 5:
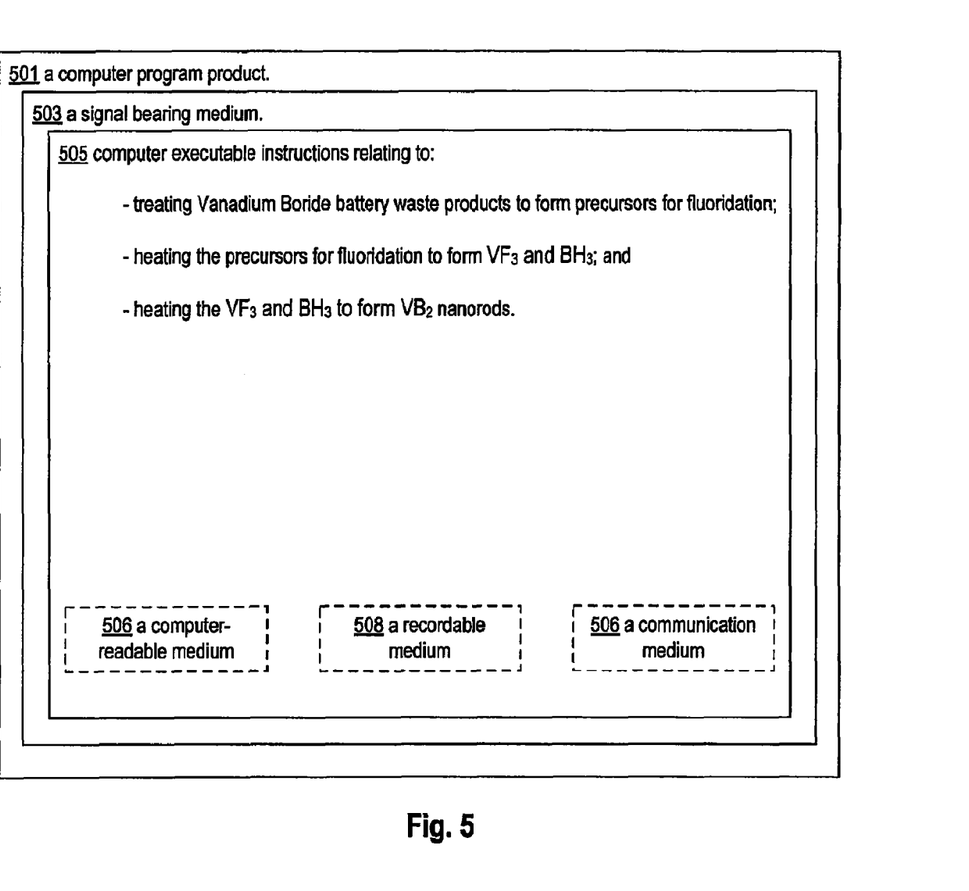
FIG. 5 illustrates a block diagram of an example computer program product, in accordance with the present disclosure.

FIG. 5 illustrates a block diagram of an example computer program product 500 that is arranged in accordance with at least some examples of the present disclosure. In some examples, computer program product 500 includes a signal bearing medium 502 that may also include computer executable instructions 505. Computer executable instructions 505 may be arranged to provide instructions for Vanadium Boride nanoparticle synthesis. Such instructions may include, for example, instructions relating to treating Vanadium Boride battery waste products to form precursors for fluorination, heating the precursors for fluorination to form $VF_3$ and $BH_3$, and heating the $VF_3$ and $BH_3$ to form $VB_2$ nanorods. Such instructions further may include, for example, instructions may relate to adjusting a rate of heating of a stainless steel autoclave, the heating being provided by a hot plate or other heating element, adjusting temperature set points for heating, adjusting a pressure of a chamber used in processing, pressure being manipulated using a pump, or controlling quantities of added materials, as well as to other process parameters. More specifically, instructions may be communicated to a heating element, a pressure controller, a pump, conveyor belts, and the like. Generally, the computer executable instructions may include instructions for performing any steps of the Vanadium Boride nanoparticle synthesis described herein.

Also depicted in FIG. 5, in some examples, computer product 500 may include one or more of a computer readable medium 506, a recordable medium 508 and a communications medium 510. The dotted boxes around these elements may depict different types of mediums that may be included within, but not limited to, signal bearing medium 502. These types of mediums may distribute computer executable instructions 505 to be executed by computer devices including processors, logic and/or other facility for executing such instructions. Computer readable medium 506 and recordable medium 508 may include, but are not limited to, a flexible disk, a hard disk drive (HDD), a Compact Disc (CD), a Digital Video Disk (DVD), a digital tape, a computer memory, etc. Communications medium 510 may include, but is not limited to, a digital and/or an analog communication medium (e.g., a fiber optic cable, a waveguide, a wired communication link, a wireless communication link, etc.).

The present disclosure is not to be limited in terms of the particular examples described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting. These are for illustration only and are not intended to be limiting.

The present disclosure generally relates to systems and methods for Vanadium Boride nanoparticle synthesis. In some examples, a first method for fluorine based Vanadium Boride nanoparticle synthesis is described. The first described method may include providing Vanadium Boride battery waste products, treating the battery waste products to form precursors for fluorination, heating the precursors for fluorination to form $VF_3$ and $BH_3$, and heating the $VF_3$ and $BH_3$ to form $VB_2$ nanorods in a liquid mixture, wherein the first method may be performed at a temperature that is less than approximately 700° C.

In a further example, a second method for fluorine based Vanadium Boride nanoparticle synthesis is described. The second described method may include providing $V_2O_x$ and $B_2O_x$, adding $(NH_4)HF_2$ to the $V_2O_x$, acid dissolving the $B_2O_x$ to form $(NH_4)_3VF_6$ and $H_2O$, and washing the $B_2O_x$ with NaOH to form $NaBH_4$. The second described method may further include adding to the $(NH_4)_3VF_6$, and heating the $(NH_4)_3VF_6$, $H_2O$, and $NaBH_4$ to above approximately 300° C. to form 3 $NH_3$, 3 HF, $VF_3$, NaH, and $BH_3$. The second method may also include heating the 3 $NH_3$, 3 HF, $VF_3$, NaH, and $BH_3$ to above about 500° C. to form $VB_2$ nanorods, HF, NaF, and $H_2$.

In yet a further example, a computer accessible medium is provided for operably enabling a computing device to perform Vanadium Boride synthesis. The computer accessible medium has computer executable instructions stored thereon for execution by the computing device to perform the procedure. The procedure may comprise treating Vanadium Boride battery waste products to form precursors for fluorination, heating the precursors for fluorination to form $VF_3$ and $BH_3$, and heating the $VF_3$ and $BH_3$ to form $VB_2$ nanorods.

In accordance with another example, a system for Vanadium Boride synthesis is provide. The system includes a chamber, a shell, a heating element, a pump, and a controller. The chamber is configured for receiving $V_2O_x$ and $B_2O_x$. The shell is configured for receiving the container. The heating element heating element is operably associated with the chamber and configured to heat the chamber. The pump is operably associated with the chamber and configured to adjust pressure in the chamber. The controller is coupled to the heating element and the pump and is configured for operating the heating element to heat the chamber and operating the pump to adjust pressure in the chamber.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically matable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for Vanadium Boride synthesis comprising:
    treating battery waste products of a Vanadium Boride battery to form precursors for fluorination;
    heating the precursors for fluorination to form $VF_3$;
    heating a compound including $BH_4$ to form $BH_3$;
    heating the $VF_3$ and $BH_3$ to form $VB_2$ nanorods in a liquid mixture; and
    wherein the method is performed at a temperature that is less than approximately 700° C.

2. The method of claim 1, further comprising removing the $VB_2$ nanorods and other reaction products.

3. The method of claim 1, wherein treating the battery waste products comprises adding $(NH_4)HF_2$ and acid dissolution followed by NaOH treatment.

4. The method of claim 1, wherein the precursors to fluorination comprise $(NH_4)_3VF_6$.

5. The method of claim 1, wherein heating the precursors to fluorination further comprises heating the precursors to fluorination to a temperature of approximately 300° C.

6. The method of claim 1, wherein heating the $VF_3$ and $BH_3$ further comprises heating the $VF_3$ and $BH_3$ to a temperature of approximately 500° C.

7. The method of claim 1, further comprising pouring the liquid mixture through a filter to capture the $VB_2$ nanorods.

8. The method of claim 1, further comprising removing HF and $H_2$, wherein HF and $H_2$ are formed during the heating of the $VF_3$ and $BH_3$.

9. A method for Vanadium Boride synthesis comprising:
adding $(NH_4)HF_2$ to a Vanadium Oxide to form $(NH_4)_3VF_6$ and $H_2O$;
acid dissolving a Boron Oxide and washing the Boron Oxide with NaOH to form $NaBH_4$;
adding to the $(NH_4)_3VF_6$ and heating the $(NH_4)_3VF_6$, $H_2O$, and $NaBH_4$ to above approximately 300° C. to form 3 $NH_3$, 3 HF, $VF_3$, NaH, and $BH_3$; and
heating the 3 $NH_3$, 3 HF, $VF_3$, NaH, and $BH_3$ to above 500° C. to form $VB_2$ nanorods, HF, NaF, and $H_2$.

10. The method of claim 9, wherein the Vanadium Oxide and the Boron Oxide are provided in a single container and all subsequent steps are carried out in that container.

11. The method of claim 9, wherein the Vanadium Oxide and the Boron Oxide are provided in separate containers and all steps are carried out separately until heating of the 3 $NH_3$, 3 HF, $VF_3$, NaH, and $BH_3$.

12. The method of claim 9, further comprising removing the HF.

13. The method of claim 9, further comprising removing the $H_2$.

14. The method of claim 9, further comprising pouring the $VB_2$ and NaF through a filter to capture the $VB_2$ nanorods.

15. A non-transitory computer accessible medium having stored thereon computer executable instructions, which, when executed by a computing device, operably enable the computing device to perform a procedure for Vanadium Boride synthesis the procedure comprising:
treating Vanadium Boride battery waste products to form precursors for fluorination;
heating the precursors for fluorination to form $VF_3$
heating a compound including $BH_4$ to form $BH_3$; and
heating the $VF_3$ and $BH_3$ to form $VB_2$ nanorods.

16. The non-transitory computer accessible medium of claim 15, wherein heating the precursors to fluorination comprises heating the precursors to fluorination to a temperature of approximately 300° C.

17. The non-transitory computer accessible medium of claim 15, wherein heating the $VF_3$ and $BH_3$ comprises heating the $VF_3$ and BH3 to a temperature of approximately 500° C.

* * * * *

UNITED STATES PATENT AND TRADEMARK OFFICE
CERTIFICATE OF CORRECTION

PATENT NO. : 8,404,199 B2
APPLICATION NO. : 12/999963
DATED : March 26, 2013
INVENTOR(S) : Kruglick It is certified that error appears in the above-identified patent and that said Letters Patent is hereby corrected as shown below:

On the Title Page, Item (56), under "OTHER PUBLICATIONS", in Column 2, Line 8, delete "No. 28" and insert -- No. 28, --, therefor.

On Title Page 2, Item (56), under "OTHER PUBLICATIONS", in Column 1, Line 2, delete "No. 7" and insert -- No. 7, --, therefor.

On Title Page 2, Item (56), under "OTHER PUBLICATIONS", in Column 1, Line 5, delete "No. 1-2" and insert -- No. 1-2, --, therefor.

On Title Page 2, Item (56), under "OTHER PUBLICATIONS", in Column 1, Line 6, delete "Chemistray" and insert -- Chemistry --, therefor.

On Title Page 2, Item (56), under "OTHER PUBLICATIONS", in Column 1, Line 8, delete "No. 26" and insert -- No. 26, --, therefor.

On Title Page 2, Item (56), under "OTHER PUBLICATIONS", in Column 2, Line 2, delete "No. 28" and insert -- No. 28, --, therefor.

On Title Page 2, Item (56), under "OTHER PUBLICATIONS", in Column 2, Line 4, delete "No. 3" and insert -- No. 3, --, therefor.

On Title Page 2, Item (56), under "OTHER PUBLICATIONS", in Column 2, Line 8, delete "No. 2" and insert -- No. 2, --, therefor.

In the Drawings

In Fig. 4, Sheet 4 of 5, delete "uP/uC / DSP" and insert -- $\mu P/\mu C/DSP$ --, therefor.

Signed and Sealed this
Eleventh Day of June, 2013

Teresa Stanek Rea
*Acting Director of the United States Patent and Trademark Office*

In Fig. 5, Sheet 5 of 5, in Line 1, delete "506 a communication" and insert -- 510 a communications --, therefor.

In the Specifications

In Column 4, Line 56, delete "nanocrystallilzaton" and insert -- nanocrystallization --, therefor.

In Column 4, Line 58, delete "(HO" and insert -- ($H_2$) --, therefor.

In Column 5, Line 13, delete "[($NH_4$)$HF_2$ -]" and insert -- [($NH_4$)$HF_2$] --, therefor.

In Column 5, Line 21, delete "recover" and insert -- recovery --, therefor.

In Column 6, Line 9, delete "nanords" and insert -- nanorods --, therefor.

In Column 7, Line 33, delete "(HDD)," and insert -- (HDDs), --, therefor.

In Column 7, Line 35, delete "(SSD)," and insert -- (SSDs), --, therefor.

In Column 7, Line 45, delete "(DVD)" and insert -- (DVDs) --, therefor.

In the Claims

In Column 12, Line 55, in Claim 1, delete "$VF_3$," and insert -- $VF_3$; --, therefor.

In Column 12, Line 56, in Claim 1, delete "$BH_3$," and insert -- $BH_3$; --, therefor.

In Column 12, Line 62, in Claim 2, delete "$VB_2$nanorods" and insert -- $VB_2$ nanorods --, therefor.

In Column 13, Line 10, in Claim 8, delete "$H_2$are" and insert -- $H_2$ are --, therefor.

In Column 13, Line 17, in Claim 9, delete "$NaBH_4$," and insert -- $NaBH_4$; --, therefor.

In Column 14, Line 16, in Claim 15, delete "$VF_3$" and insert -- $VF_3$; --, therefor.

In Column 14, Line 18, in Claim 15, delete "$BH_3$to" and insert -- $BH_3$ to --, therefor.

In Column 14, Line 25, in Claim 17, delete "BH3" and insert -- $BH_3$ --, therefor.